United States Patent [19]
Thomsen et al.

[11] 3,753,777
[45] Aug. 21, 1973

[54] SURFACE CLEANING METHOD

[75] Inventors: Donald L. Thomsen, Minneapolis; Ferdinand J. Herpers, Jr., Minnetonka, both of Minn.

[73] Assignee: Tennant Company, Minneapolis, Minn.

[22] Filed: Oct. 13, 1971

[21] Appl. No.: 188,760

[52] U.S. Cl............................ 134/6, 134/10, 134/21, 134/34, 134/37, 134/40
[51] Int. Cl......... B08b 7/04, B08b 3/08, B08b 1/04
[58] Field of Search .................. 134/6, 10, 21, 40, 134/34, 37; 210/52

[56] References Cited
UNITED STATES PATENTS

| | | | |
|---|---|---|---|
| 2,003,847 | 6/1935 | Woods | 134/6 |
| 3,011,206 | 12/1961 | Breither | 134/6 X |
| 3,079,285 | 2/1963 | Rockwell | 134/21 X |
| 3,197,798 | 8/1965 | Brown et al. | 15/320 |
| 3,338,828 | 8/1967 | Clark | 210/52 |
| 3,492,224 | 1/1970 | Ryzmar | 210/54 |
| 3,524,811 | 8/1970 | Tsuk et al. | 210/52 |

*Primary Examiner*—Barry S. Richman
*Attorney*—Dugger, Peterson, Johnson and Westman

[57] ABSTRACT

A method for cleaning surfaces such as floors and pavements that includes incorporating a polyelectrolyte in the cleaning solution and a surface scrubbing machine for carrying out the process. As specifically disclosed, the method comprises applying the cleaning solution to the surface together with agitating the solution on the surface to cause formation of flocs, removing the floc containing solution from the surface by, for example, squeegeeing, and returning the recovered solution to a solution tank and, if desired, separating out the flocs. With a scrubbing machine the solution tank is on the machine, and the agitation may be provided by, for example, a rotary brush on the machine, or by applying the cleaning solution to the surface by forcing the solution under pressure through discharge nozzles. Although not necessary for some cleaning operations, in others a detergent or soap compatible with the polyelectrolyte is incorporated in the solution. With various combinations of polyelectrolyte and detergent, the addition of a suitable flocculation aid such as metallic salts to the solution enhances the degree of flocculation and the strength and size of the flocs.

22 Claims, 3 Drawing Figures

PATENTED AUG 21 1973 3,753,777

INVENTOR.
DONALD L. THOMSEN
FERDINAND J. HERPERS JR.
BY
Dugger Peterson Johnson & Westman
ATTORNEYS

SURFACE CLEANING METHOD

BACKGROUND OF THE INVENTION

A method of scrubbing surfaces such as floors and pavements with a scrubbing machine wherein the same cleaning solution is recycled and reused after filtering out solid material from the recovered cleaning solution.

Experiments have been conducted with a hydrocyclone to try to clarify dirty scrub water for possible use in scrubbing machines; however, due to the fineness and low densities of the colloidal particles in the dirty scrub water, only a small fraction of the weight of the suspended particles are successfully removed. As a result of the remaining particles of dirt the scrub water that outflows from the hydrocylone is still too dirty for reuse.

In the prior art, filters, including reverse osmosis systems, have been tried in order to clarify water for recycling in a scrubbing machine. However, due to the small size of the dirt particles and large number of them in the dirty scrub water, the filters plug quickly and thus require frequent cleaning or changing. The filters must be extremely fine to remove the small particles and thus plug quickly, and require considerable power to operate. Centrifuges have also been tried for clarifying dirty scrub water for reuse in scrubbing machines, but the high cost of centrifuges and associated equipment together with high power requirements make centrifuges impractical in a scrubbing machine The present day scrubbing process most frequently used involves providing at least two solution tanks on a scrubbing machine, one being a clean solution tank that contains clean water and detergent for scrubbing and a second being a dirty solution tank into which the recovered dirty scrub water is returned. When all the clean solution has been used for scrubbing, the machine is returned to a suitable refilling point where the dirty solution tank is emptied and the clean solution tank is filled, and thence the machine is returned to the point where the scrubbing operation is recommenced. The dirty water is usually dumped down the drain causing further problems for waste treatment facilities and causing pollution problems. It has been estimated that up to 30 percent to 50 percent of the machine use time with this type of operation is in the clean solution preparation, the emptying of the dirty solution tank and transport time back and forth from the work area to the fill and empty point. On scrubbers now in use only one half of the existing tank capacity is useful for containing cleaning solution because the other one half must be used to hold recovered dirty scrub water.

In scrubbing surfaces the fine particles of dirt become uniformly dispersed in the scrubbing solution on the surface and when the dirty water is picked up (usually with a squeegee,) the thin film of water that is left on the surface after squeegeeing also carries these fine dirt particles and when the residual water dries, a film of dirt is left on the surface, even with the most efficient squeeging system.

Frequently it is necessary to go over the scrubbed surface a second time with clean rinse water in the clean solution tank in order to remove a part of the dirty film left on the surface after the first scrubbing operation.

In order to overcome problems such as the above, including minimizing the frequency of having to replenish the clean solution supply, reducing dumping and travel time as well as overcoming other problems, this invention has been made.

SUMMARY OF THE INVENTION

A process for wet scrubbing surfaces that includes adding a flocculating agent, with or without the addition of a detergent to the clean solution dispensed on the surface to be cleaned, agitating the cleaning solution dispensed on the surface to loosen dirt thereon and removing the dirty solution from the surface. In a scrubbing machine the process includes separating the formed flocs out of the cleaning solution removed from the surface, returning the separated solution directly to the surface or to a clean solution tank provided on the machine so the cleaning solution can be reused, if desired.

An object of the invention is to make the small dirt particles in scrub water to floc together into large enough flocs or agglomerates so that the flocs can be easily separated from the scrub water without the severe plugging previously encountered.

An object is to present a machine that can utilize scrubbing solution containing flocculation agents and recover solution containing the flocs and separate out the flocs so the recovered, clarified solution can be reused for additional scrubbing.

An object is to form large flocs on the surface before the solution is picked up. The large flocs are suspended and a film of clarified solution is left on the surface behind the pick up means.

DESCRIPTION OF THE PREFERRED EMBODIMENT

Broadly this invention is directed to using polyelectrolytes in a scrubbing solution that is utilized in scrubbing a surface such as floors, pavements, walls and the like to provide flocculation of the soilage right on the surface, and removing the flocculated dirty solution from the surface. In floor or surface scrubbing machines the steps of filtering out the flocs and recycling the filtered solution to effectively use the solution more than once is included. In most scrubbing operations the polyelectrolyte is to be used in combination with a compatible detergent or soap. The normal small particles are made to floc together to form large flocs which can withstand mechanical action and which can be separated from the solution without constantly plugging filters or screens.

The inclusion of polyelectrolytes in the solvent (usually water) in the cleaning solution tank of a scrubbing machine, which solution is applied to the surface to be cleaned, together with agitation of the solution on the surface, results in the immediate formation of flocs on the surface. The flocs, because of air entrainment or other reasons tend to remain suspended or to float so that a film of clarified solution is left on the surface after the solution is removed to actually clean rinse the surface. The flocs may be readily separated out of the recovered solution. The clarified filtered solution is reused during the scrubbing operation. In the "Condensed Chemical Dictionary," 7th ed, 1966, published by Reinhold Publishing Company polyelectrolytes are defined as follows: "High molecular weight electrolytes of either natural origin (proteins, polysaccharides) or of a synthetic nature. They may be either weak or strong electrolytes. Since the polyelectrolytes in solution do not disassociate to give a uniform distribution of positive and negative ions, as do simple electrolytes, the ions of one sign are bound to the polymer chain. Thus for instance, the positive charges may be in the polymer chain, and only negative ions will be free to diffuse through the solvent."

The actual mechanics of flocculation with the aid of a high molecular weight polyelectrolyte is not fully understood. There have been papers written describing various theories, but the actual mode of action is not well understood, and descriptions are usually written in generalities. There are two basic actions that seem to be the starting points for most theories. When the polyelectrolyte is highly ionic in nature, it may work by charge neutralization on the charged particles in suspension, permitting them to agglomerate. Polyelectrolytes of very high molecular weight also may become physically adsorbed on two or more particles per molecule, which is called bridging. The neutralization of electrical charges on the adsorbed polyelectrolyte molecules then may cause it to coil and to become enmeshed with agglomerates of other molecules with similar particle holding characteristics.

With the wetting and emulsifying power of a detergent the following theory of flocculation with the aid of high molecular weight polyelectrolytes for use in scrubbers is offered as one plausible mode of action. The system that is to be described is one of a solution composed of water, high molecular weight polyelectrolyte and a compatible detergent. The detergent releases the particles from the soiled surface by emulsifying and wetting them. At this point on present scrubbing machines, the puddle on the surface has fine dirt particles dispersed throughout so that as the squeegee passes, it leaves a film of this dirt containing solution which dries and leaves a small portion of the dirt particles on the surface. With a high molecular weight polyelectrolyte in solution the dirt detergent micelles and colloids in the solution agglomerate and large flocs are formed. These flocs are then light enough to suspend in the solution or even float. The suspension or floatation does require agitation to be most effective. This suspension or floatation may be due to surface tension, air inclusions or other reasons, but in any event the flocs do not settle out rapidly so the area between the agitation means and the subsequently operable solution pickup means is rinsed with essentially clean solution. Also, in a machine, as the squeegee passes over the puddle, these large suspended or floating agglomerates are easily picked up with the cleaning solution. Because the solution left on the surface by the squeegee is of clarified water, when the film dries there are few, if any dirt particles left. A light penetrating process for comparing surface cleanliness illustrates the benefit of the film of clarified water on the surface and is described in detail subsequently in this specification.

It has been noted that some combinations of polyelectrolytes and detergents did not work until a metal salt flocculating aid, for example ferric chloride ($FeCl_3$), was added to the solution. Immediately large tough flocs were formed that were easily removed leaving a well clarified scrub water. One explanation of this phenomena may be that the metallic salt ionically alters surface electrical charges to permit more effective action by the polyelectrolyte. In some examples the flocculating aid permits a reduction of the polyelectrolyte used, resulting in greater economy for similar results.

Water soluble synthetic polyelectrolytes usable in this invention comprise polymers having molecular weights of at least 5,000 including for example, polyacrylamide, copolymers of acrylamide with copolymerizable monomers such as acrylic acid, acrylonitrile, diacetone acrylamide and other N-substituted acrylamides, sulfonated polystyrene, polyethyleneimine, polymers of diallyl quaternary ammonium monomers, polyacrylic acid and its salts, polyamines, and polyethylene oxide. Since the water soluble synthetic polyelectrolytes disclosed in U.S. Pat. Nos. 3,345,841 and 3,492,224 may be used as well as others, a more detailed listing is not believed necessary.

Water soluble natural polyelectrolytes usable in this invention include guar gums (polysaccharides), starch derivatives and modified starches, caragean moss, sodium alginate and other natural polyelectrolytes well known in the art.

Usually it is desirable (although not necessary) to incorporate a detergent or soap in the cleaning solution. The type of detergents that are usable include for example an alkyl sulfate, an alkyl sulfonate, an alkyl-aryl sulfonate, sulfonated amide (all anionic); a fatty acid-polyethylene condensate, a phenol-polyethylene glycol condensate, an alcohol-polyethylene glycol condensate, a mercaptan-polyethylene glycol condensate (all nonionic); and quaternary ammonium and tertiary amines obtained after condensing ethylene oxide with fatty acids (all cationic). The chemical nature of detergents is vast, and the above list is for illustrative purposes to indicate the wide range of utility and not for limitation.

All detergents do not work well with all polyelectrolytes. However, generally a cationic polyelectrolyte works well with either a nonionic or anionic detergent, a nonionic polyelectrolyte works with a cationic or nonionic detergent and an anionic poly-electrolyte works with a cationic or nonionic detergent. With ampholytic detergents the pH of the scrubbing solution is the major factor in choice of polyelectrolyte. In addition to the compatability of the detergent and polyelectrolyte, other conditions influencing the selection of the particular detergent and polyelectrolyte to be used together include pH of the solution, the type and amount of soilage on the surface to be cleaned and concentrations of the detergent and polyelectrolyte.

A simple test to determine whether or not a given polyelectrolyte is suitable, or combination of polyelectrolyte and detergent or soap is suitable, for carrying out the invention comprises placing known quantities of each ingredient including water containing soil in different order in a glass container, covering the container, manually shaking vigorously for a few seconds, letting the container set a few seconds, and then visually observing to see if flocs are formed and if clarification of water results. For example, dirt, polyelectrolyte and detergent in known amounts can be added to 100 ml of water in the container; or in place of dirt and water, dirty scrub water from the area to be cleaned can be used.

If no detergent or soap is used, and the polyelectrolyte does clarify the water, or form flocs, it is suitable. If a particular polyelectrolyte in combination with a particular detergent did flocculate dirt from a dirt solution, then the particular combination of detergent and polyelectrolyte tested is considered suitable. If a particular combination of polyelectrolyte and detergent in dirty water resulted in most of the detergent coming out of solution with the flocs (usually apparent as a slime) or if the detergent comes out of solution without flocculating the soilage, then the detergent-polyelectrolyte combination is considered unsuitable. However, as previously indicated, for example, some combinations that are not suitable may become so with addition of a flocculant aid such as ferric chloride, incorporated in the solution.

The pH of a solution makes quite a difference in the effectiveness of a given polyelectrolyte and a range of pH is generally suggested by the manufacturer of the polyelectrolyte. Thus it is desirable but not necessary that the cleaning solution include a suitable buffering agent so that the filtered dirty scrub water maintains a fairly small range in pH value. The actual pH and pH range most suitable varies from one combination of detergent and polyelectrolyte to another.

Although the desirable concentration of polyelectrolyte in a cleaning solution for carrying the process of this invention varies from one polyelectrolyte to another and the concentration of and type of detergent or soap, if any, in the solution, and the concentration of and type of flocculating aid, if any, the useful limit range of polyelectrolyte is about 0.0002 percent to 5 percent, (by weight) of the solution with the usual desired range being 0.001 percent to 2 percent; while the desirable amount of detergent in solution, if used, usually will be in the range of about 0.5 percent to 15 percent (by weight) of the solution. Generally, if a given detergent is compatible with a particular polyelectrolyte, it is compatible at any reasonable and useful concentration of either the detergent or the polyelectrolyte.

It has further been found that the surface cleaning results from the use of a particular polyelectrolyte or a particular combination of a polyelectrolyte and detergent (or soap) may be enhanced with the addition of small amounts of metal flocculent aids. Examples are ferric chloride, alum and ferrous sulfate. These metal flocculant aids are generally polyvalent and are well known and used in water and sewage treatment plants to effect improved solids precipitation.

Figure 1:
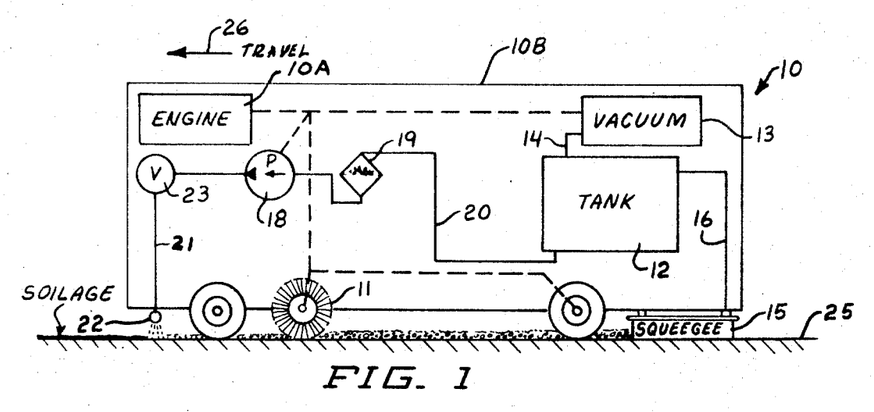
FIG. 1 is a diagrammatic illustration of one machine for carrying out the process of this invention.

One diagrammatic illustration of a machine suitable for carrying out this invention for scrubbing surfaces is shown in FIG. 1 wherein a mobile scrubbing machine, generally designated 10, includes power source, such as an engine 10A or an electric drive motor mounted on a frame represented by the outline box 10B. The engine is used to power the components of the machine and also to propel the machine, if desired. Also an operators seat and steering controls may be provided. A power driven scrub brush 11 is rotatably mounted on the machine frame and driven from engine 10A. A solution tank 12, is mounted on the frame and a source of vacuum such as a motor drive vacuum pump or suction blower 13 is fluidly connected to the top of tank 12 by a line 14 to apply a vacuum to the tank. A squeegee 15 (or other suitable recovery apparatus) is mounted on the rear part of the frame and engages a surface 25 for collecting dirty scrubbing solution from the surface. A line 16 is connected to tank 12 and extends adjacent to or is connected to the squeegee for returning the dirty scrubbing solution collected by the squeegee to tank 12 under vacuum. A pump 18 and a strainer or filter screen 19 are connected in series in a line 20 that is connected between the bottom of tank 12 and discharge line 21. The line 21 is connected to a solution distributor line or nozzles 22 that discharge clean scrubbing solution onto the surface 25 to be cleaned, forwardly of the brush 11 in the normal forward direction of motion of the machine indicated by arrow 26. A control valve 23 is provided in line 21 to control discharge of clean solution onto surface 25.

When the solution is recycled several times between changes of cleaning solution in tank 12, the strainer must have capacity to permit several recycling operations. The strainer may be, for example, a loose woven cloth or throw away paper insert or a wire screen (for example 80 mesh wire screen) to separate out the large floc from the dirty solution. The screen 19 may be located in any number of desired locations, for example, right in tank 12, in line 16, at the squeegee 15 or as shown on the inlet of pump 18.

The drives for the machine are only illustrated schematically but could be belt, chain or hydraulic drives with remote motors. Scrubbing machines of the general type are well known in the art, but because of the essence of this invention, the formation of large flocs allows the use of a relatively open strainer in the circulation line permitting reuse of the clarified solution. The flocs can be separated out easily without plugging the strainer because the openings can be quite large, and the floc will readily fall off the screen after they are separated from the cleaning solution. A vertically oriented screen, for example could be vibrated and the large flocs collected in a bottom tray or compartment.

The brush illustrated for agitation is shown as a rotary brush extending across the machine but the agitation means could be disc type brushes, or reciprocating brush sections. The agitation also could be done with spray nozzles to violently agitate the solution carrying the polyelectrolyte with soilage on the surface to get proper flocculation. Also, air under pressure may be directed onto the solution to agitate the solution. The term "agitation means" is therefore to be broadly construed. The agitation means such as a scrubbing brush, spray nozzles, or air under pressure, scrub and violently agitate the solution on the surface.

Figure 2:
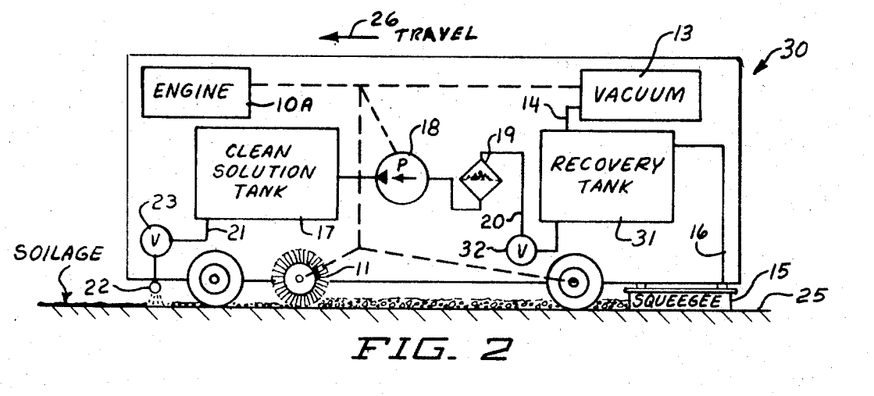
FIG. 2 is a diagrammatic illustration of a second machine for carrying out the process of this invention.

With reference to FIG. 2, there is shown a scrubbing machine, generally designated 30, which instead of using only one tank has a clean solution tank 17 and a recovery tank 31. Dirty scrubbing solution collected by squeegee 15 is returned through line 16 to tank 31 while a vacuum from source 13 is applied through line 14 to tank 31. A pump 18 and strainer 19 are connected in series in a line 20 that extends between the recovery tank 31 and the clean solution tank 17. A line 21 connects the clean solution tank 17 to a solution distributor line 22 which has nozzles or openings to deposit solution on the surface.

Although the strainer 19 has been shown outside of the tanks, it may be physically located for example in either of tanks 31 or 17 or in line 16 or on squeege 15 as long as it is of a construction that material separated out of the solution passed therethrough is retained within a fixed space and the flocs separated out are not allowed to flow with the solution being discharged from the tank for application to the surface being cleaned. Thus, for example, in the first form of the invention line 16 may extend into tank 12 and a filter may be mounted on the discharge end of the line or in squeegee assembly 15 to retain the flocs within the interior of the filter.

A valve 32 in line 20 can be closed off and the unit used as an ordinary two tank scrubbing machine. One tank for clean solution and one for recovery of dirty scrubbing solution. The valve 32 is open for illustration of this invention.

A scrubbing machine showing agitation brushes, a solution tank, vacuum blower and the general arrangement for squeegees is shown in U.S. Pat. No. 3,197,798.

In carrying out the process of this invention, which is schematically illustrated in the drawings in connection with the machines, the cleaning solution tank 12 or 17 is filled with a cleaning solution, which by way of illustration will be considered to include a detergent and a compatible polyelectrolyte. Thereafter the machine 10 or 30 is moved to the area to be cleaned, the valve 23 is opened to apply the cleaning solution on the surface or on the brushes. The brushes, or other suitable violent agitation means, loosens the dirt and soilage on the surface; the detergent aiding in loosening and emulsifying the soilage. The polyelectrolyte in the solution together with the violent agitation causes the dirt to form strong large flocs which suspend or float in the solution on the surface between the brush and the squeegee 15. This stratifies the puddle on the surface into a suspension of flocs and a layer of clear solution on top of the surface being cleaned. The vacuum applied to the tank 12 or 31 results in the solution and flocs adjacent the squeegee to flow through line 16 to the tank 12 or 31. Because the film of solution on the surface is substantially clear and free of dirt, only a thin film of clarified cleaning solution remains on the surface behind the squeegee. The above mentioned agitation (brush) helps to clean the surface, aids in the flocculation process and may introduce air into the flocs. Solution can be removed easily from the floor or surface by various means, for example with the vacuum and rubber squeegee leaving a clean surface.

As the cleaning solution with suspended flocs flows through the strainer 19, regardless of its position and toward the discharge line 21, the flocs are separated out of the solution. If there is a screen or filter on either end of line 16, most of the flocs would be retained in this screen.

Figure 3:
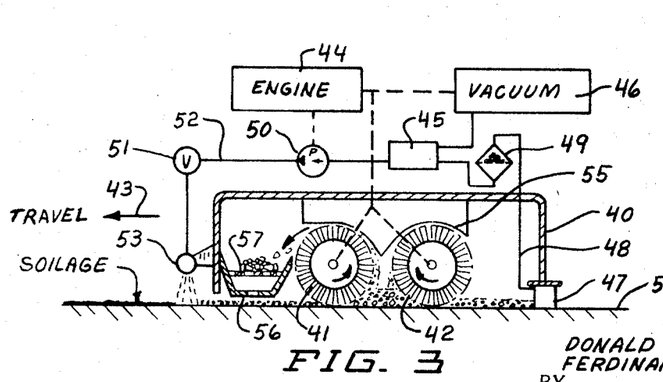
FIG. 3 is a schematic sectional view of a mobile scrubbing machine using a double brush scrubber and a form of separator for flocs which deposits clarified solution back on the surface for reuse.

FIG. 3 illustrates the use of a double brush scrubbing unit for agitation and to illustrate another way scrubbing solution can be recirculated and reused in a machine for carrying out the process. A frame 40 rotatably mounts a pair of brushes 41 and 42 which extend transversely to the direction of movement of the unit shown by arrow 43. The frame can be mounted on wheels or supported by a power vehicle. A double brush scrubber of this type is disclosed in U.S. Pat. No. 3,702,488 issued Nov. 14, 1972. The brushes 41 and 42 may be rotated by power source 44 in a desired direction as indicated by the arrows on the brushes. The brushes may be rotated in opposite or same direction as desired. A solution tank 45 is provided as is a vacuum source 46 which applies a vacuum to tank 45 and draws solution from a squeegee 47 through a line 48 and a strainer or filter 49 in line 48 into the tank 45. The solution is pumped with pump 50 through a valve 51 in a line 52 to a solution distributor line 53. The solution is applied to the surface 54 and as the unit is moved in the direction of arrow 43 the brushes 41 and 42 agitate the solution, and actually pick up the solution on the surface and carry it up against a deflector 55 mounted on the frame. The deflector directs the major portion of the solution over brush 41. A screen trap trough 56 is mounted adjacent the brush 41 in the path of material carried by the brush and has a screen 57 dividing the trough so that solution flows onto the screen 57 and the flocs are held on the top of the screen while the liquid, which is clarified as it passes through the screen, is returned to the surface 54 for reuse directly without going back through tank 45 and distributor 53.

The squeegee 47 is used to collect the solution which remains on the surface after passage of the double brush unit.

The distributor line 53 is used to add sufficient solution to the surface to make up for the used solution picked up by the squeegee. The material which is picked up by the squeegee is strained through strainer or filter 49 and the clarified solution is recycled and reused.

The flocs again are large and either float or are suspended sufficiently so that the flocs are all picked up and a clear film of solution is all that is left on the surface after the squeegee has passed. Therefore the squeegee acts as a flocsolution separator to leave a clarified solution film on the surface without small dirt particles in the film.

As a result of providing the polyelectrolyte, the solution passed through the filter or strainer is clarified, but still contains detergent and polyelectrolyte. Thus the solution may be recycled a number of times, the number in part depending on the amount of solution left on the surface behind the squeegee. When the solution is all used the machine is returned to the filling point, the collected flocs carrying the dirt particles from the surface scrubbed being disposed of in a suitable refuse container rather than being discharged into the sewer system, and the clean solution tank is refilled with the solution containing flocculating agent and if desired soap or detergent.

Any suitable type of pump may be used for pumping the cleaning solution from the tank to be applied to the brush or surface; for example it may be electrically, mechanically or hydraulically powered, and it may be self priming. The pump is used to overcome the vacuum head in the tank. However, other pickup and recirculation systems can be used. For example, instead of using a vacuum to move the material from the squeegee to the tanks 12, 31, or 45, a suitable pump may be connected in the return line 16 or 48 and the liquid may feed from the tank (12, 31, or 45) to the surface by only gravity flow. The strainer trough of FIG. 3 is gravity flow for filtering and recycling of solution.

In place of a brush for furnishing violent agitation, the cleaning solution from the tank may be directed under high pressure by discharge nozzles, preferably discharging downwardly and forwardly in the normal direction of forward movement of the machine.

The manner of obtaining a cleaning solution containing a polyelectrolyte flocculating agent and a compatible detergent or soap can be varied. For example, a number of polyelectrolytes can be added in a concentrated form to a powdered detergent, next dried, then regranulated and thereafter mixed with water to form the cleaning solution. If the polyelectrolyte is of a type that it does not go into solution relatively rapidly, then desirably a concentrated aqueous solution is made ahead of time, and thereafter the concentrated solution and detergent are mixed with water to form the cleaning solution.

Also, dispensers may be provided to discharge metered amounts of the detergent and/or polyelectrolyte respectively into a cleaning solution already in the tank. Further it is possible to place a slowly dissolvable cake of detergent and/or polyelectrolyte in the tank to maintain the desired concentration of detergent and/or polyelectrolyte in the cleaning solution over a longer length of time.

It has been found that the polyelectrolytes that are effective in the process of this invention are those which are capable of increasing the agglomeration of the collidal particles, as well as other entrained solids, in the scrubbing solution on the surface being cleaned to a size that can be easily removed from the solution to leave a clarified water having most of the soilage particles removed therefrom. The flocs formed must be strong enough so they will not mechanically be redispersed before separation, they must be large enough to be easily separated and they must be effective enough to clarify the cleaning solution for reuse. For satisfactory operations, the polyelectrolyte used is of a type so that the polyelectrolyte remaining in solution after the removal of the agglomerates (flocs) is virtually unchanged from that in the initial solution whereby it will effectively remove solids during each subsequent cycle.

As indicated various polyelectrolytes are compatible with cationic detergents. Since cationic detergents are greatly used as disinfectants, the process of this invention can be used in scrubbing operations where disinfectant detergents are required.

In examples 1–27 of Table II, the concentrations used are 1 percent detergent, 0.01 percent flocculent and 1 percent each type of dirt except scrub water with solids of 0.5 percent by weight of the solution. For each example the listed ingredients were mixed as indicated in the above described test and the mixture allowed to set. Then the size of flocs was estimated and a visual observation of the clarity of the liquid was made. With reference to Tennant 670 and Tennant 622 which are a liquid nonionic, slightly alkaline detergent based on polyethanol and alkylolamide condensates and an anionic powdered detergent of medium alkalinity based on alkyl aryl sulfonate and sodium lauryl sulphate types of detergents respectively made and sold by Tennant Company, while Catanac-SN is a liquid cationic detergent based on stearamide ammonium nitrate detergent sold by American Cyanamid.

The flocculents of various examples are listed by tradename of the companies as follows and have a chemical base as indicated in Table I.

TABLE I

| Polyelectrolyte Flocculents | Chemical Base | PROPRIETOR |
|---|---|---|
| Jaguar 22A | modified guar gum | Stein, Hall and Co. |
| Coagulant | | |
| 2 | polyelectrolyte | Calgon Corp. |
| 18 | polyelectrolyte bentonite | " |
| 226 | polyelectrolyte | " |
| 235 | polyelectrolyte | " |
| Cat-floc | polyelectrolyte | " |
| Magnifloc | | |
| 560 | polyelectrolyte | American Cyanamid Company |
| 570 | polyelectrolyte | " |
| 836A | polyelectrolyte | " |
| 820A | polyacrylamide | " |
| 837 | polyacrylamide | " |
| 837A | polyacrylamide | " |
| 865A | polyacrylamide | " |
| 900N | polyacrylamide | " |
| 901N | polyacrylamide | " |
| 905N | polyacrylamide | " |
| Purfloc | | |
| A-23 | polyelectrolyte | Dow Chemical Company |
| C-31 | polyamine | " |
| N-11 | polyacrylamide | " |
| N-12 | polyacrylamide | " |
| N-17 | polyacrylamide | " |
| Separan C-41 | polyelectrolyte | " |
| Gendriv | | |
| 162 | modified guar gum | General Mills Chemicals, Inc. |
| 158 | modified guar gum | " |
| XG458-S | modified guar gum | " |
| Sanfax Duplix | proprietary sludge treatment product | Oxford Chemical Company |

In the following tables, the Magnifloc products are proprietary products of American Cyanamid Company, the Coagulant products of Calgon Corporation, the Purfloc and Separan products of Dow Chemical Company, and Gendriv products and XG 458-S of General Mills Chemicals, Inc. In the examples of each of Tables III – V, the dirt used was A.C. Fine at 1 percent, and the detergent at 1 percent and flocculent 0.01 percent by weight of the solution. As to the examples of Table III, no flocculent aid was added to the solution while for the example of Table IV, ferric chloride was added to the solution in an amount to be about 0.05 percent by weight of the solution, and for the examples of Table V, alum was added to the solution in an amount to be 5 percent by weight. A visual observation was made and the results graded as to the suitability of the combination for flocculating dirt, the relative sizes of flocs formed and the appearance of the liquid in the container after the flocs had formed.

TABLE II

| | Detergent | | Flocculent | | | | |
|---|---|---|---|---|---|---|---|
| Name | Charge | Concentration, percent | Trade name | Charge | Dirt | Estimated floc size (inches) | Estimated clarity |
| 1 | Tennant #622 (powder) | Anionic | 1 | Coagulent 226 | Cationic | A.C. fine | $\frac{1}{16}-\frac{1}{32}$ | Translucent. |
| 2 | do | do | 1 | do | do | Kaolin clay | $\frac{1}{16}-\frac{1}{32}$ | Do. |
| 3 | do | do | 1 | do | do | Scrub water | $\frac{1}{16}-\frac{1}{32}$ | Do. |
| 4 | do | do | 1 | Magnifloc 901N | Nonionic | A.C. fine | $>\frac{1}{16}$ | Clear. |
| 5 | do | do | 1 | do | do | Kaolin clay | $\frac{1}{16}-\frac{1}{32}$ | Translucent. |
| 6 | do | do | 1 | do | do | Scrub water | $\frac{1}{16}-\frac{1}{32}$ | Do. |
| 7 | do | do | 1 | Purifloc A-23 | Anionic | A.C. fine | Did not floc | Opaque. |
| 8 | do | do | 1 | do | do | Kaolin clay | do | Do. |
| 9 | do | do | 1 | do | do | Scrub water | do | Do. |
| 10 | Tennant #670 (liquid) | Nonionic | 1 | Magnifloc 560 | Cationic | A.C. fine | $>\frac{1}{16}$ | Clear. |

TABLE II – Continued

| | Detergent | | Flocculent | | | | | |
|---|---|---|---|---|---|---|---|---|
| | Name | Charge | Concentration, percent | Trade name | Charge | Dirt | Estimated floc size (inches) | Estimated clarity |
| 11 | do | do | 1 | do | do | Kaolin clay | >1/16 | Translucent. |
| 12 | do | do | 1 | do | do | Scrub water | >1/16 | Clear. |
| 13 | do | do | 1 | Magnifloc 905N | Nonionic | A.C. fine | 1/16-1/32 | Do. |
| 14 | do | do | 1 | do | do | Kaolin clay | >1/16 | Do. |
| 15 | do | do | 1 | do | do | Scrub water | >1/16 | Translucent. |
| 16 | do | do | 1 | Magnifloc 837 | Anionic | A.C. fine | Did not floc | Opaque. |
| 17 | do | do | 1 | do | do | Kaolin clay | do | Do. |
| 18 | do | do | 1 | do | do | Scrub water | do | Do. |
| 19 | Catanac-SN (liquid) | Cationic | 1 | Magnifloc 570 | Cationic | A.C. fine | Did not floc | Do. |
| 20 | do | do | 1 | do | do | Kaolin clay | do | Do. |
| 21 | do | do | 1 | do | do | Scrub water | do | Do. |
| 22 | do | do | 1 | Coagulant 2 | Nonionic | A.C. fine | <1/16 | Translucent. |
| 23 | do | do | 1 | do | do | Kaolin clay | <1/16 | Do. |
| 24 | do | do | 1 | do | do | Scrub water | <1/16 | Do. |
| 25 | do | do | 1 | Coagulant 235 | Anionic | A.C. fine | <1/16 | Clear. |
| 26 | do | do | 1 | do | do | Kaolin clay | <1/16 | Do. |
| 27 | do | do | 1 | do | do | Scrub water | <1/16 | Do. |

TABLE III.—WITHOUT ADDITIVES—DIRT A.C. FINE

| | Detergent | Charge | Flocculent (trade name) | Charge | Molecular weight | Chemical base | Remarks |
|---|---|---|---|---|---|---|---|
| 28 | Tennant #670 | Nonionic | Gendriv 162 | Cationic | | Guar gum | Excellent*, large/clear. |
| 29 | do | do | XG 458-S | do | | do | Good-excellent, med./trans. |
| 30 | Tennant #622 | Anionic | Purifloc C-31 | do | | Polyamine | Good, med./trans. |
| 31 | do | do | Magnifloc 865A | Anionic | $4 \times 10^6$ | Polyacrylamide | Good-excellent, large/trans. |
| 32 | Catanac-SN | Cationic | Purifloc N-12 | Nonionic | | do | Do. |
| 33 | do | do | Purifloc A-23 | Anionic | | Polyelectrolyte | Do. |
| 34 | do | do | Magnifloc 820A | do | $6 \times 10^6$ | Polyacrylamide | Excellent*, large/clear. |
| 35 | do | do | Magnifloc 837A | do | $15 \times 10^6$ | do | Good-excellent*, med./clear. |

*Clear effluent.

TABLE IV.—WITH FeCl₃ ADDITIVE—DIRT A.C. FINE

| | Detergent | Charge | Flocculent (trade name) | Charge | Molecular weight | Chemical base | Remarks |
|---|---|---|---|---|---|---|---|
| 36 | Tennant #670 | Nonionic | Purifloc N-17 | Nonionic | | Polyacrylamide | Good-excellent, large/trans. |
| 37 | do | do | Magnifloc 905N | do | $15 \times 10^6$ | Polyelectrolyte | Excellent*, large/clear. |
| 38 | do | do | Magnifloc 900N | do | $4 \times 10^6$ | do | Good-excellent*, med./clear. |
| 39 | do | do | Magnifloc 901N | do | $10 \times 10^6$ | do | Good-excellent, large/trans. |
| 40 | do | do | Purifloc A23 | Anionic | | do | Excellent*, large/clear. |
| 41 | do | do | Magnifloc 865A | do | $4 \times 10^6$ | Polyacrylamide | Do.* |
| 42 | do | do | Magnifloc 836A | do | $15 \times 10^6$ | Polyelectrolyte | Good-excellent, med./trans. |
| 43 | Tennant #622 | Anionic | Coagulant 226 | Cationic | | do | Excellent*, large/clear. |
| 44 | do | do | Purifloc N-17 | Nonionic | | Polyacrylamide | Do.* |
| 45 | do | do | Purifloc N-12 | do | | do | Do.* |
| 46 | do | do | Magnifloc 905N | do | $15 \times 10^6$ | Polyelectrolyte | Do.* |
| 47 | do | do | Magnifloc 900N | do | $4 \times 10^6$ | do | Do.* |
| 48 | do | do | Coagulant 235 | Anionic | | do | Good-excellent, large/trans. |
| 49 | do | do | Magnifloc 865A | do | $4 \times 10^6$ | Polyacrylamide | Good-excellent*, med./clear. |
| 50 | do | do | Magnifloc 836A | do | $15 \times 10^6$ | Polyelectrolyte | Good-excellent, med./trans. |
| 51 | Catanac-AN | Cationic | Purifloc N-12 | Nonionic | | Polyacrylamide | Good-excellent, large/trans. |
| 52 | do | do | Magnifloc 905N | do | $15 \times 10^6$ | Polyelectrolyte | Good-excellent*, med./clear. |
| 53 | Catanac-SN | do | Magnifloc 900N | do | $4 \times 10^6$ | do | Good-excellent, med./trans. |
| 54 | do | do | Coagulant 2 | do | | do | Good-excellent, large/trans. |
| 55 | do | do | Purifloc N-11 | do | | Polyacrylamide | Good, med./trans. |
| 56 | do | do | Magnifloc 837A | Anionic | $15 \times 10^6$ | do | Good-excellent*, med./clear. |
| 57 | do | do | Magnifloc 820A | do | $6 \times 10^6$ | do | Excellent*, large/clear. |

*Clear effluent

TABLE V.—WITH ALUM ADDITIVE—DIRT A.C. FINE

| | Detergent | Charge | Flocculent (trade name) | Charge | Molecular weight | Chemical base | Remarks |
|---|---|---|---|---|---|---|---|
| 58 | Tennant #670 | Nonionic | Gendriv 158 | Cationic | | Guar gum | Good, med./trans. |
| 59 | Catanac-SN | Cationic | Purifloc N-17 | Nonionic | | Polyacrylamide | Do. |
| 60 | do | do | Coagulant 18 | do | | Polyelectrolyte, bentonite | Good-excellent*, med./clear. |
| 61 | do | do | Magnifloc 570C | Cationic | | Polyelectrolyte | Do.* |
| 62 | do | do | Magnifloc 835A | Anionic | $15 \times 10^6$ | Polyacrylamide | Good, large/trans. |

*Clear effluent.

In the examples of Table VI (examples 63–69), tests of the nature described above were made, the concentration of the flocculent (and flocculent aid — Example 68) and the dirt (A.C. Fine) being given in the table. No detergent or soap was used for each of these examples and only Example 68 included a flocculent aid. Thus, in this invention, polyelectrolytes may be used without the inclusion of a detergent or soap in surface cleaning operations.

TABLE VI

| | Flocculent | A.C. fine, percent | Floc size, inches | Clarity |
|---|---|---|---|---|
| 63* | Separan C-41 (.1%) | 3 | >⅙ | Clear. |
| 64* | Magnifloc 560C(.01%) | 5 | >⅙ | Do. |
| 65** | Magnifloc 905N(.01%) | 5 | >⅙ | Do. |
| 66*** | Magnifloc 865A(.01%) | 5 | >⅙ | Do. |
| 67** | Magnifloc 901N(.01%) | 5 | >⅙ | Do. |
| 68** | Magnifloc 901N(.01%) plus Ferric chloride (.05%) | 5 | >⅙ | Clear. Amber. |
| 69 | Gendriv 162 (.02%) | 5 | >⅙ | Clear. |

*Cationic.   Nonionic.   *Anionic.

Experiments prepared by the test previously described demonstrate the effect of the use of flocculent aids to permit reduction of the concentration of polyelectrolyte for economic reasons, see Table VII. The "a" portion of each Example 70–73 was a control run of a polyelectrolyte while the "b" portion is a run of the same polyelectrolyte in reduced concentration with the indicated flocculent aid added. The concentrations of the "b" portion of each example resulted in essentially the same clarity of water and size and strength of flocs (ascertained visually) as the "a" of the same example. In each of Examples 70–73 the dirt was 3 percent A.C. Fine that was suspended in water. The concentrations are given in percent by weight.

TABLE VII

| Detergent | | Flocculent | Flocculent Aid |
|---|---|---|---|
| 70a | 10%-Tennant No. 670 | 0.02% Magnifloc 905N | — |
| 70b | " | 0.01% do. | 0.12% FeCl₃ |
| 71a | " | 0.02% Magnifloc 900N | — |
| 71b | " | 0.01% do. | 0.12% FeCl₃ |
| 72a | " | 0.10% Purfloc C-31 | — |
| 72b | " | 0.05% do. | 0.12% FeCl₃ |
| 73a | 3% Tennant No. 622 | 0.06% Cat-floc | — |
| 73b | " | 0.03% do. | 1.0% NaCl |

EXAMPLES 74 AND 75

Using the same test as previously described an ampholytic detergent was tested. The detergent was Deriphant 154 manufactured by General Mills Chemicals, Inc. Water containing a 1 percent concentration of detergent and 2 percent by weight of shop dirt was used. For example 74 addition of 0.02 percent of Cat-floc resulted in agglomeration of the particles and a clarified solution. For example 75 .02 percent of Sanfax Duplix was added to the detergent-dirt solution and this resulted in formation of flocs with a clear remaining solution.

EXAMPLE 76

As an example of using soap, a test of nature above described was made wherein 3 percent Ivory Flakes and 0.2 percent Separan C-41 (a cationic high molecular weight polyelectrolyte product of Dow Chemical Co.) and dirty scrub water mixture was made. Flocs floated to the top while the remaining solution was very clean.

EXAMPLE 77

Another example of use of soap was a dirty scrub water solution which had 3 percent of Fels Naptha (bar soap) and 0.06 percent Sanfax Duplix (a flocculent aid sludge conditioner of Oxford Chemicals) and 0.06 percent Gendriv 162 added thereto. Flocs formed and floated but the resulting solution was a rather translucent off white.

With most soaps the pH range is near neutral and therefore a polyelectrolyte that works good in a neutral solution should be used for best results. Also, generally when using a soap, a higher concentration of a polyelectrolyte is required than when a synthetic detergent is used.

EXAMPLE 78

Using the same test as the prior examples, to dirty scrub water there was added 10 percent Tennant 670 detergent, 0.02 percent Gendriv 162 and 2 percent Sanfax Duplix. This provides a clarified solution having the flocs floating in the solution.

Examples 79, 80 and 81 of Table VIII are results obtained by using the process of the invention for scrubbing floors with a working model surface scrubbing machine designed and built according to the illustration in FIG. 1. The machine has a basket or filter 19 of 80 mesh stainless steel woven wire screen attached to the recovery tank 12, for separating and retaining the formed flocs from the recovered clarified scrubbing solution, and a 12 volt transfer pump 18, connecting the bottom of the recovery tank 12 to the solution distributor line 21.

A control valve 23 is located down stream of the pump to allow the operator to control the flow of the solution to the surface as well as a solution shut-off. Comparison of the cleanliness of the cleaned floor between a standard scrubbing procedure with a production model 42HD scrubber manufactured by the Tennant Company of Minneapolis, Minnesota, using a brush 11 for agitation and the procedure the invention practiced with the working model scrubber previously described were made using a device called "Mr. Dirtcheck" manufactured by Gardner Laboratory, Inc. of Bethesda, Maryland. The device consists of a handle used to secure a swatch of absorbant paper so that it may be rubbed on the surface under test, and a second piece of apparatus consisting of a light source and a light sensitive photoelectric cell with an appropriate meter and scale reading from 0 to 100. Light is passed through the swatch and onto the light sensitive photoelectric cell, the amount of light being registered on the meter. A reading of 0 indicates that no light is passing through the swatch. A reading of 100 shows that there are no dirt particles obstructing the light passage through the swatch. With a clean swatch in the holder the surface was rubbed six times per test with a down pressure of about 950 gms. The length of each stroke and test area were controlled with the use of a guide permitting a 10 inch movement over the exact same area.

A test surface was prepared by cleaning and rinsing until a Mr. Dirtcheck reading of 100 was obtained. Then an amount of soilage consisting of the following mixture was spread evenly with the aid of a push broom over the test floor.

40 percent A.C. Fine
40 percent Kaolin Clay
10 percent Water soluble cutting oil (Vantrol 545 Van Stranten Chemical Co.)
5 percent Karo Syrup (Dark)
5 percent Shop Grease (Molylith Grease American Oil Co.) and a measured quantity of water to make a paste like consistancy.

For each portion of each example the area of floor scrubbed was 102 feet$^2$, and the area scrubbed before having the dirt mixture thereon (clean floor) had a Mr. Dirtcheck reading of 100. In portion "a" of each example no flocculent product was used while in portion "b" the indicated flocculent was used. The column "Before" is after the dirt mixture was spread on the floor, the column "After" was the reading after the machine had scrubbed the floor, and the column "No Passes" indicates the number of times the machine was operated over the same surface using the same cleaning solution. For each portion of each example the volume of cleaning solution initially placed in the cleaning solution tank was 8 liters, the cleaning solution containing the detergent and flocculent water in the concentrations indicated under the columns "Detergent Product" and "Flocculent Product" respectively. The amount of dirt placed on the floor for each portion of each example prior to scrubbing is indicated under "Wt. Dirt Gms."

Visual observation of the scrubbing operation showed a significant difference between scrubbing with the process of the invention, and the conventional scrubbing procedure. The process of the invention showed large flocs (1/16 inch to ¼ inch) suspended and surrounded by clean scrubbing solution whereas the conventional scrubbing operation showed a very dirty scrubbing solution before the squeegee which left a film of this dirty water on the floor and in the cracks and other surface imperfections.

Four Mr. Dirtcheck tests were made and averaged after the floor had dried both before and after scrubbing. Results show that there was obtained a cleaner floor using the process of the invention than by scrubbing the floor in the conventional manner. The tests show that the clarified water is essentially rinsing the floor between the agitation means and the pick up means of the modified scrubbing machine.

used. If the same size machine were used, then a larger area can be scrubbed without recharging the cleaning solution tank.

Various runs were made using the simple test set forth prior to Table I and using a scrubbing machine under actual operating condition which confirmed that the sample dirt described was usable to determine whether or not a given polyelectrolyte was suitable, or combination of polyelectrolyte and detergent or soap was suitable.

The surfaces on which the process is used of course can be varied. While floors, pavements and walls have been primarily mentioned the process is readily adapted and used in cleaning all surfaces including exterior building and vehicle surfaces or the surfaces of storage tanks and drums.

The flocs do not have to be disposed of through sewer systems, but can be treated through solid waste treatment facilities, relieving the load on sewage treatment plants and reducing the contamination and pollution threat to waterways.

We claim:

1. A process for scrubbing surfaces of soilage comprising the steps of applying a cleaning solution containing a polyelectrolyte flocculating agent to said surface; scrubbing and violently agitating the solution on the surface being cleaned to loosen the soilage and cause formation of flocs on said surface, and removing the flocculated material and solution from said surface.

2. The process of claim 1 wherein the agitated solution is permitted to remain on the surface to permit flocs to form to leave a film of clarified solution on the surface prior to removal of the flocculated material and solution from the surface.

3. The process of claim 1 further characterized in that flocs float off the surface with remaining clarified solution adjacent the surface, and wherein the step of removing the flocculated material and solution from said surface comprises removing the flocs and a major portion of the solution, and leaving only a film of clarified solution on said surface.

4. The process of claim 3 including the further step of separating the flocs from the clarified solution subsequent to removal from said surface.

5. The process of claim 4 including the further step

TABLE VIII

|  | Detergent product | Flocculent product | Area, ft.$^2$ | Wt. dirt applied (gms.) | Mr. Dirtcheck | | | | Soln. volume, liters | No. of scrubbing passes |
|---|---|---|---|---|---|---|---|---|---|---|
|  |  |  |  |  | Before cleaning | After (4 tests) | | | | |
|  |  |  |  |  |  | Ave. | High | Low | | |
| 79a | #670(6.6%) | None | 102 | 77 | 24 | 64 | 70 | 54 | 8 | 1 |
| 79b | #670(6.6%) | Sanfax 2%, Jaguar 22A .02% | 102 | 77 | 24 | 90.5 | 94 | 82 | 8 | 1 |
| 80a | #670(6.6%) | None | 102 | 77 | 30.5 | 68.0 | 88 | 58 | 8 | 1 |
| 80b | #670(6.6%) | Sanfax 2%, Jaguar 22A .02% | 102 | 77 | 30.5 | 95.5 | 98 | 92 | 8 | 1 |
| 81a | #670(6.6%) | None | 102 | 77 | 30.5 | 94.0 | 96 | 92 | 8 | 2 |
| 81b | #670(6.6%) | Sanfax 2%, Jaguar 22A .02% | 102 | 77 | 30.5 | 97.3 | 98 | 96 | 8 | 2 |

Note that various detergents can be mixed together and various polyelectrolytes can be mixed for use in accordance with this invention as long as they are compatible.

As a result of this invention the same cleaning solution can be recycled a number of times (other than for the flocs filtered out). Accordingly a smaller machine may be used for scrubbing a given surface area to obtain a cleaner surface than if a polyelectrolyte were not of reapplying the solution from which flocs are removed.

6. A process for scrubbing a surface with a surface scrubbing machine having a cleaning solution tank, comprising the steps of at least partially filling the tank with a cleaning solution having a polyelectrolyte therein, applying the cleaning solution from the tank to the surface to be cleaned and scrubbing and violently agitating the solution on the surface to form flocs containing the soilage from the surface and polyelectrolyte, recovering at least a substantial part of the solution having the flocs therein, and returning the recovered solution to the cleaning solution tank and reapplying the recovered solution to the surface including separating out the flocs whereby the recovered solution having the flocs separated therefrom is recycled to again be applied to the surface.

7. The process of claim 6 further characterized in that the cleaning solution includes a detergent or soap compatible with the polyelectrolyte to aid in loosening the soilage from the surface being cleaned.

8. The process of claim 6 further characterized in that the solution applying step comprises brushing the surface having the cleaning solution thereon to aid in loosening the soilage from the surface and to aid in forming and suspending the flocs as they are formed.

9. The process of claim 6 further characterized in that the recovery and returning steps include applying a vacuum to the tank and to a squeegee of the machine fluidly connected thereto to induce fluid flow from the surface to the tank to draw solution containing the flocs into the tank, and filtering out of the flocs from the solution returned to the tank to block recycling of the flocs with the solution in the tank that is subsequently applied to the surface.

10. The process of claim 6 further characterized in that the polyelectrolyte has a molecular weight of at least 5,000 and is of a concentration in the solution in the range of about 0.0002 percent to 5 percent by weight as it is being used.

11. A process for scrubbing a surface with a surface scrubbing machine having a tank for containing a cleaning solution to be dispensed on the surface and receive recovered solution from the surface, means for agitating solution dispersed on the surface, means for recovering a solution from the surface and returning the recovered solution to the tank, and a filter for filtering the solution returned to the tank, the steps of at least partially filling the tank with a cleaning solution with a suitable polyelectrolyte of an effective concentration for flocculating soilage on the surface, applying the solution from the tank to the surface ahead of the recovery means in the normal forward direction of movement of the machine together with scrubbing and violent agitation to form flocs containing the soilage that are suspended in the solution on the surface, and recovering at least a major portion of solution to remove flocs from the surface to leave a film of clarified solution on the surface and return the recovered solution to the tank to mix with the solution therein, said process including separating out flocs from the solution recovered from the surface and retaining the flocs out of the solution subsequently applied to the surface whereby at least part of the original solution in the tank is recycled without recycling of the flocs.

12. The process of claim 11 further characterized in that the cleaning solution includes a detergent or soap compatible with the polyelectrolyte to aid in loosening the soilage from the surface.

13. The process of claim 12 further characterized in that the step of scrubbing and violently agitating the solution on the surface includes machine brushing the surface.

14. The process of claim 12 further characterized in that the step of applying the solution to the surface includes dispensing the solution and directing air under pressure on the solution on the surface to agitate the solution.

15. The process of claim 12 further characterized in that the polyelectrolyte is of a concentration of about 0.001 percent to 2 percent by weight of the solution.

16. The process of claim 12 further characterized in that a flocculation aid compatible with the detergent and polyelectrolyte is incorporated in the solution in an effective amount to enhance the formation of flocs of strength and size suitable for separation.

17. The process of claim 12 further characterized in that the scrubbing and violently agitating steps comprise discharging the solution from the tank onto the surface under high pressure.

18. A process for scrubbing surfaces with a mobile scrubbing machine wherein a cleaning solution is applied to the surface from a cleaning solution tank on the machine with violent agitation of the solution on the surface, a substantial portion of the applied solution is removed from the surface rearwardly in the normal direction of movement of the machine from the location of application of the solution, and the recovered solution is returned to the tank to be recycled to the surface including the separating out of a major portion of the entrained solids from the recovered solution to block recycling said solids, the improvement comprising incorporating a polyelectrolyte in the solution in the tank that will flocculate the soilage that is loosened from the surface to clarify the solution at the location of agitation whereby the flocs are removed from the surface with the solution recovered from the surface, the polyelectrolyte being of an effective concentration to form flocs of a size and strength that can be readily separated from the recovered solution.

19. The process of claim 18 further characterized in that the concentration of the polyelectrolyte in the solution is at least about 0.001 percent by weight of the solution.

20. The process of claim 19 further characterized in that a detergent compatible with the polyelectrolyte and of a type that loosens soilage from the surface is incorporated in the solution to aid in loosening soilage from the surface.

21. A process for scrubbing a surface with a scrubbing machine having a cleaning solution tank, comprising the steps of at least partially filling the tank with a cleaning solution having therein, a polyelectrolyte and a detergent compatible with the polyelectrolyte to aid in loosening soilage from the surface being cleaned, applying the cleaning solution to the surface being cleaned including scrubbing and violently agitating the solution on the surface to loosen the soilage and cause formation of flocs on said surface and removing the flocculated material and solution from said surface.

22. The process of claim 21 further characterized in that the removing step includes returning the recovered solution to the cleaning solution tank, and that the applying step includes reapplying the recovered solution to the surface including separating out flocculated material whereby the recovered solution having the flocs separated therefrom is recycled to again be applied to the surface.

* * * * *